US009805722B2

(12) United States Patent
König et al.

(10) Patent No.: US 9,805,722 B2
(45) Date of Patent: Oct. 31, 2017

(54) INTERACTIVE SPEECH RECOGNITION SYSTEM

(75) Inventors: Lars König, Ulm (DE); Rainer Saam, Ulm (DE); Andreas Löw, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 2039 days.

(21) Appl. No.: 11/948,075

(22) Filed: Nov. 30, 2007

(65) Prior Publication Data

US 2008/0221891 A1  Sep. 11, 2008

(30) Foreign Application Priority Data

Nov. 30, 2006 (EP) .................................. 06024859

(51) Int. Cl.
*G10L 15/04* (2013.01)
*G10L 15/28* (2013.01)

(52) U.S. Cl.
CPC .................. *G10L 15/285* (2013.01)

(58) Field of Classification Search
CPC .. G01C 21/3608; G08G 1/0969; G10L 15/08; G10L 15/183
USPC ................................................. 704/252–275
See application file for complete search history.

(56) References Cited

U.S. PATENT DOCUMENTS

| | | | |
|---|---|---|---|
| 6,230,132 B1 | 5/2001 | Class | |
| 6,356,837 B1 * | 3/2002 | Yokota et al. | 701/411 |
| 6,591,189 B2 * | 7/2003 | Shimada | 701/428 |
| 7,657,368 B2 * | 2/2010 | Weiss et al. | 701/420 |
| 2001/0027374 A1 * | 10/2001 | Hashimoto | 701/208 |
| 2003/0065516 A1 * | 4/2003 | Hitotsumatsu | 704/275 |
| 2005/0055210 A1 | 3/2005 | Venkataraman | |
| 2005/0080632 A1 * | 4/2005 | Endo et al. | 704/277 |
| 2006/0010138 A1 * | 1/2006 | Huerta et al. | 707/100 |
| 2006/0029188 A1 * | 2/2006 | Salafia et al. | 379/37 |
| 2006/0074660 A1 * | 4/2006 | Waters | G10L 15/26 704/251 |
| 2006/0074661 A1 | 4/2006 | Takaichi | |
| 2006/0100776 A1 * | 5/2006 | Weiss et al. | 701/200 |
| 2006/0100856 A1 * | 5/2006 | Kang et al. | 704/9 |
| 2006/0253251 A1 * | 11/2006 | Puranik et al. | 701/211 |

(Continued)

FOREIGN PATENT DOCUMENTS

| | | |
|---|---|---|
| DE | 19709518 | 3/1998 |
| EP | 1197950 | 4/2002 |

OTHER PUBLICATIONS

Deshmukh et al; "Hierarchical search for large-vocabulary conversational speech recognition; working toward a solution to the decoding problem" IEEE Signal Processing Magazine, IEEE Service Center, Piscaraway, NJ US vol. 16, No. 5, Sep. 1999, ISSN: 1053-5888.

*Primary Examiner* — Douglas Godbold
*Assistant Examiner* — Mark Villena
(74) *Attorney, Agent, or Firm* — Sunstein Kann Murphy & Timbers LLP

(57) ABSTRACT

An interactive speech recognition system includes a database containing a plurality of reference terms, a list memory that receives the reference terms of category "n," a processing circuit that populates the list memory with the reference terms corresponding to the category "n," and a recognition circuit that processes the reference terms and terms of a spoken phrase. The recognition circuit determines if a reference term of category "n" matches a term of the spoken phrase.

18 Claims, 8 Drawing Sheets

(56) References Cited

U.S. PATENT DOCUMENTS

2007/0124057 A1* 5/2007 Prieto .................... G10L 15/26
                                                            701/532
2007/0233464 A1* 10/2007 Harada .......................... 704/10
2007/0239432 A1* 10/2007 Soong et al. .................... 704/9

* cited by examiner

INTERACTIVE SPEECH RECOGNITION SYSTEM

PRIORITY CLAIM

This application claims the benefit of priority from European Patent Application No. 06 024859.8, filed Nov. 30, 2006, which is incorporated by reference.

BACKGROUND OF THE INVENTION

1. Technical Field

This disclosure relates to speech recognition. In particular, this disclosure relates to interactive speech recognition in a vehicle environment.

2. Related Art

Some speech recognition systems may incorrectly recognize spoken words due to time variations in the input speech. Other speech recognition systems may incorrectly recognize spoken words because of orthographic or phonetic similarities of words. Such systems may not consider the content of the overall speech, and may not be able to distinguish between words having orthographic or phonetic similarities.

SUMMARY

An interactive speech recognition includes a database containing a plurality of reference terms, a list memory that receives the reference terms of category n, a processing unit that populates the list memory with the reference terms corresponding to the category n, and a recognition circuit that processes the reference terms and terms of a spoken phrase. The recognition circuit determines if a reference term of category n matches a term of the spoken phrase, and forms a path of category n by extending at least one path of category n–1 by the matched reference term of category n.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION OF THE PREFERRED EMBODIMENTS

Figure 1:
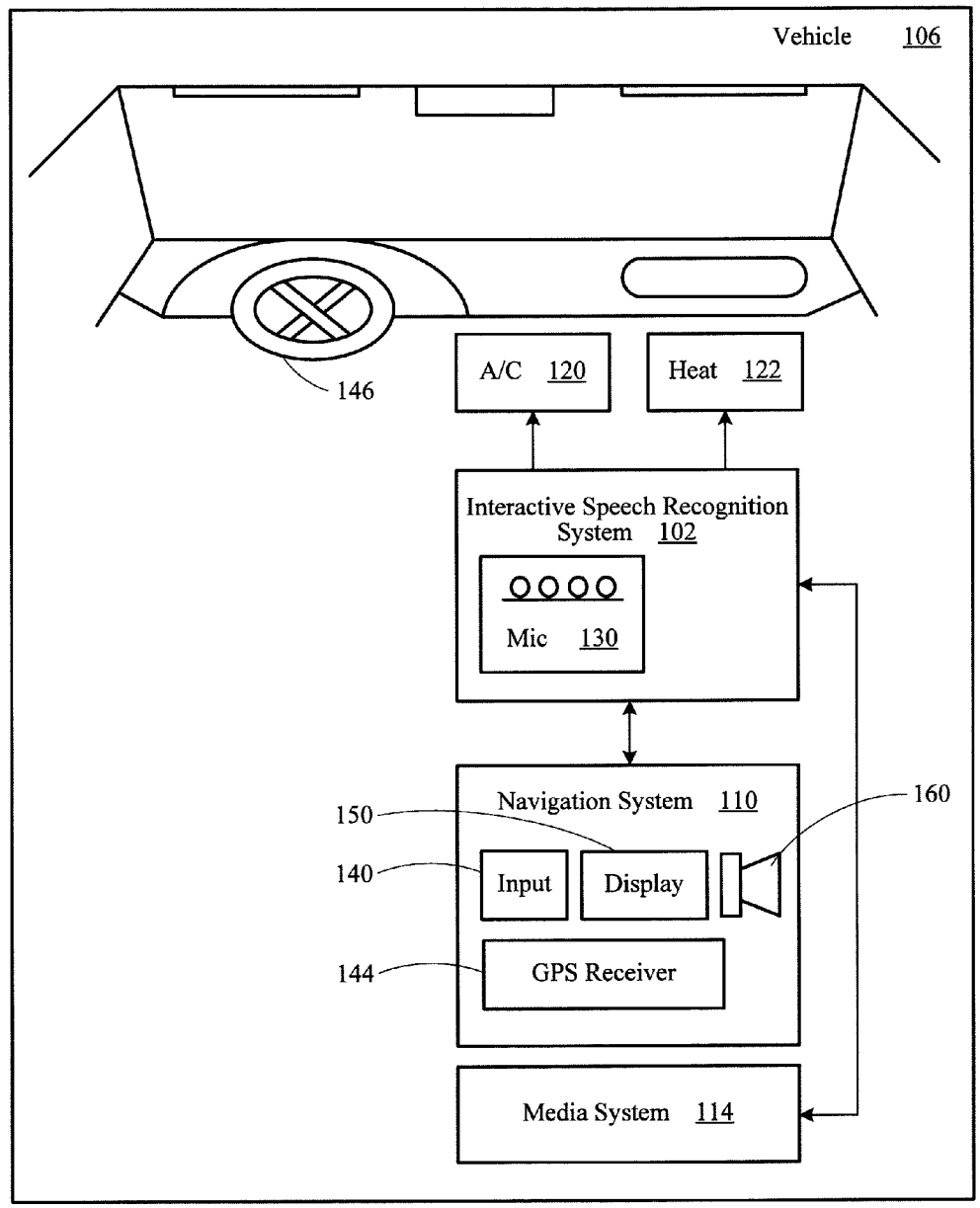
FIG. 1 is an interactive speech recognition system in a vehicle.

FIG. 1 is an interactive speech recognition system 102, which may be installed in a vehicle 106. The interactive speech recognition system 102 may communicate with a vehicle navigation system 110, a vehicle computer, remote computer, a vehicle audio/video entertainment system, media system 114, or other local or remote system (the "user-controlled system"). The interactive speech recognition system 102 may control vehicle components or systems, such as an air-conditioning system 120, a heating system 122, or other system. The interactive speech recognition system 102 may also be used in non-vehicular environments, and may communicate with a home audio/video entertainment system, media system, or other system. The user-controlled system may be a mobile device, such as a wireless telephone, personal digital assistant, or other portable or handheld device. The user-controlled system may be separate from the interactive speech recognition system 102, or the systems may be logically or physically integrated.

A user may control the user-controlled system via the interactive speech recognition system 102 by issuing a verbal command or a spoken phrase. The spoken phrase may be a complete utterance any may include a plurality of terms. The interactive speech recognition system 102 may identify and recognize the individual terms of the spoken phrase. A term ("reference term") may be recognized as a single word, such as "MELBOURNE," or may be recognized as a string or concatenation of words, which may form a command, such as "PLEASE, DRIVE ME TO . . . " Once the reference terms have been determined, the interactive speech recognition system 102 may match the reference terms of a respective category in a database to terms of the spoken phrase to obtain one or more "concatenations" or "paths" of matched reference terms of different categories. Each path may uniquely identify a database entry.

One or more microphones or microphone arrays 130 may process speech or audio signals, and may provide the speech signals to the interactive speech recognition system 102. The interactive speech recognition system 102 may parse, analyze, and "understand" a speech string or phrase so that the user-controlled system, such as the navigation system 110 or vehicle computer, may automatically take action, or take action with a minimum amount of user confirmation or supplemental user selection based an alternative command interpretation. Minimizing or eliminating user choice ("supplemental user input") or selection from among a plurality of possible command interpretations may provide improved user satisfaction.

The user-controlled system, such as the vehicle navigation system 110, may include a touchpad or a tactile input device 140 for receiving user input, such as keys, buttons, and switches. The vehicle navigation system 110 may include a global positioning system (GPS) receiver 144. In a vehicle environment, such tactile input devices 140 may be arranged on a vehicle steering wheel 146 for user convenience. The user-controlled system may include a display 150 to provide visual information to the user. The display 150 may include a touch-screen or other "soft" keyboard for receiving user commands. The display 150 may be in the form of a head-up display that may project information on a vehicle windshield. Other types of displays may be provided. A loudspeaker 160 may provide acoustic output to the user.

Figure 2:
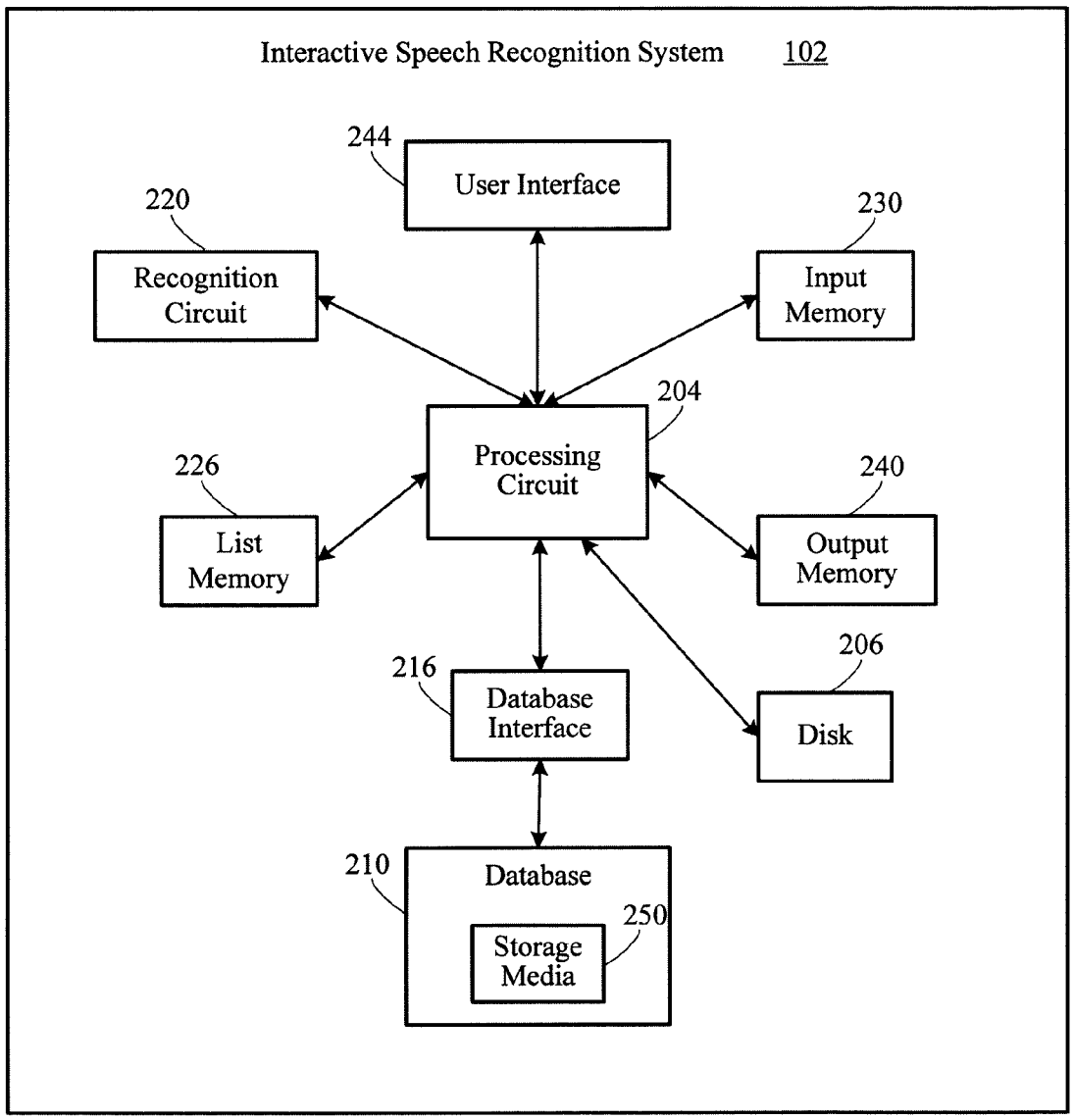
FIG. 2 is an interactive speech recognition system.

FIG. 2 is the interactive speech recognition system 102. The interactive speech recognition system 102 may include a processing circuit 204 or processor, disk-based storage 206 and other memory storage, a database 210, a database interface 216, a recognition circuit 220, a list memory 226, an input memory 230, and an output memory 240. The processing circuit 204 may be a personal computer or other microprocessor-based processing device, or may be based on other computing platforms. The recognition circuit 220 may include hardware components and/or software components, and may apply voice recognition processes to identify and extract individual words in the input speech or command phrase issued by the user. The individual words in the input speech or command phrase may be stored in the input memory 230.

The interactive speech recognition system 102 may further include a user interface 244, which may communicate with the display 150, the input devices 140, the microphone 130, and with other devices. The user interface 244 may control the inputting of a speech phrase by the user, and may output a request for supplemental user input, if needed. Supplemental user input may be needed if the interactive speech recognition system 102 does not uniquely identify the user speech phrase or command. The interactive speech recognition system 102 may minimize supplemental user input by processing the content of the speech phrase in addition to isolating and identifying individual spoken words.

Figure 3:
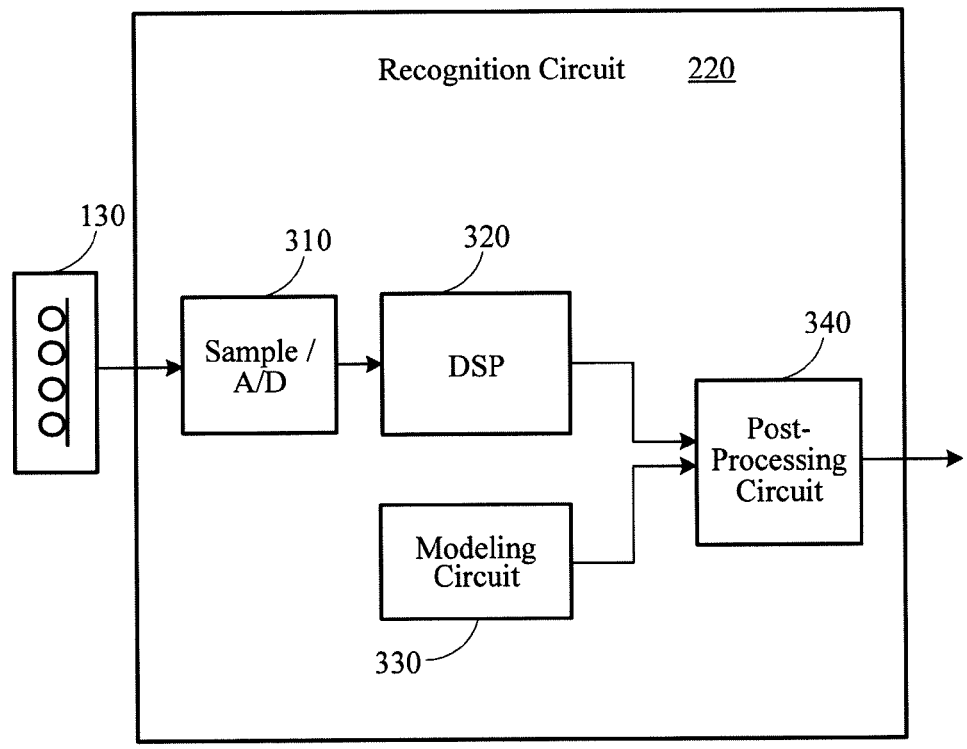
FIG. 3 is a recognition circuit.

FIG. 3 is the recognition circuit 220. An analog-to-digital converter 310 may sample and convert analog signals from the microphone 130 into sampled digital signals. The analog speech signal may be sampled at about a 10-20 KHz sample rate. Other sampling rates may be used. A digital signal processor (DSP) 320 or other processor may process the sampled digital signals. The DSP 320 may transform the sampled digitized speech signal into a time domain signal, and may identify various parameters, such as frequency, frequency spectrum, energy level, power density, and other parameters. The DSP 320 may include finite impulse response (FIR) filters, infinite impulse response (IIR) filters, and other filter components.

Human speech may include a sequence of single "phones." Phonetically similar phones may be grouped into "phonemes," which may differentiate between utterances. The phonemes of speech may be modeled using a "Hidden Markov Model," which may comprise a probability density function. A plurality of Hidden Markov Models or processes may used to recognize individual words. A speech modeling circuit 330 may communicate with the DSP 320, and may apply one or more Hidden Markov processes or other modeling processes. The recognition circuit 220 may apply a linear predictive coding (LPC) process. A post-processing circuit 340 may process the output from the DSP 320 and/or the modeling circuit 330 and may apply filtering or other processes.

The processing circuit 204 of FIG. 2 may query the database 210 through the database interface 216 to obtain a list of reference terms. Reference terms may correspond to the individual words stored in the input memory 230. The reference terms obtained from the database 210 may be stored in the list memory 226. The database 210 may include one or more storage media 250, such as a hard drive, DVD, CD, optical storage medium, or other storage media. The database 210 may be a media library, and may contain digital music files, movies or video, games, and other digital media. If the interactive speech recognition system 102 communicates with an entertainment or media system 114, the database 210 may contain a collection of entertainment media that may be identified by genre, artist, and title, or by other identifiers. Such identifiers may be associated with a category.

If the interactive speech recognition system 102 communicates with the navigation system 110, the database 210 may include navigation destinations, point of interests, digital maps, commands or other information. The database 210 may contain entries of worldwide, continent-wide, and country-wide destinations. A destination and/or points of interest may include a plurality of fields, such as country, state, city, street name, house number, house number suffix, supplementary information, and other information.

The database 210 may be a structured query language (SQL) type database, an internal/external database, an online database or other database. The database 210 may contain a plurality of database entries. Each database 210 entry may contain a plurality of different fields. The database entries may each contain the same number of fields, or may contain a different number of fields. Each field may be associated with a category. A category of order "n" may indicate a specific category from a total of "N" categories. A category of order "n−1" may indicate the category preceding category "n." A category of order "n+1" may indicate a category following the category of order "n," and may be processed after the category of order "n" is processed. Defining a path of category "n" may indicate that a path extends from the category of order "n−1" to a next "node," in other words, to a category of order "n."

The processing circuit 204 and/or the recognition circuit 220 may communicate with the list memory 226, and may compare each of the reference terms stored in the list memory 226 with the terms corresponding to the speech phrase or command stored in the input memory 230. Based on the comparison, the processing circuit 204 may determine and store in the output memory 240 various "paths" corresponding to concatenated matched reference terms.

Various commands for controlling the user-controlled systems may be stored in the database 210, which may be context based. Each command may include a field in the database 210 identifying the unit or system to be controlled, which may correspond to a highest category, followed by the field indicating the operation to be performed, which may correspond to a next highest category. For example, a command or phrase spoken by the user may be "Please set the temperature of the air-conditioning to 20 degrees." Thus, the highest category may correspond to a vehicle air-conditioning system, and the next lower category may correspond to the temperature.

Figure 4:
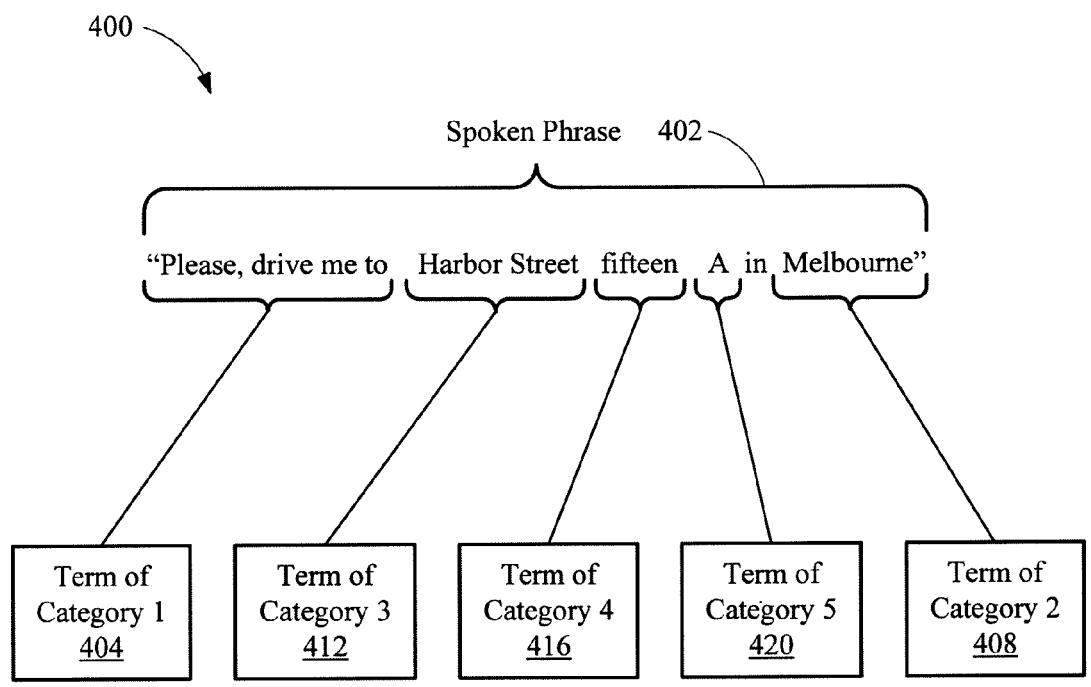
FIG. 4 is a phrase parsing process.

FIG. 4 shows parsing and analysis 400 of a speech phrase or command 402. The speech phrase may be as follows:

"PLEASE DRIVE ME TO HARBOR STREET FIFTEEN A IN MELBOURNE."

The recognition circuit 220 may determine that the term "PLEASE DRIVE ME TO" may correspond to the highest category 404, which may be designated as category 1. A category 1 term may indicate which application may be launched or which component or system may be controlled. For example, because the category 1 term may involve a driving destination, the navigation application may be launched to calculate a route for a given destination. The recognition circuit 220 may next determine that the term "MELBOURNE" may correspond to the next highest category 408, which may be designated as category 2. The term "HARBOR STREET" may correspond to category 3 (412), the term "FIFTEEN" may correspond to category 4 (416), and the term "A" may correspond to the lowest category 420, or category 5.

The hierarchical structure of various categories may depend on the matched reference term of the highest category. A matched reference term of category "n" may correspond to a reference term that can be matched to a term of the speech phrase or speech input. For example, during operation of the navigation system 110, the speech phrase may be as follows:

"PLEASE DRIVE ME TO MELBOURNE."

The command "Please Drive Me To" may be defined as a single term, and the term "MELBOURNE" may be defined as a separate term. Based on the reference terms obtained from the database 210, the recognition circuit 220 may match the term "MELBOURNE" with Melbourne, Australia, but it may also match the term with Melbourne, Fla. Thus, an ambiguity may exist, which may require further resolution.

A list of reference terms may correspond to the "content" of the fields of the database 210 associated with a requested category. As a parameter of the request, one or more matched reference terms of a previously processed category may be used. For example, a list of reference terms returned by the database 210 in response to the query for street names with the parameters "USA, Melbourne" may return all the names of all streets in Melbourne, USA. Using a structured query language (SQL), the request may have the following format:

SELECT streets FROM database WHERE country='USA' AND city='Melbourne'.

A query for street names with no parameters specified may return a list of all street names contained in the database 210 irrespective of a particular city and country. Such a request may have the following format using SQL:

SELECT streets FROM database

A "path" may be a concatenation of matched reference terms of the various categories. The recognition circuit 220 may dynamically build and/or eliminate paths when matching reference terms. If no further reference term can be matched to a term of the speech phrase at a category "n," the respective path may be eliminated. For example, if the path corresponding to "MELBOURNE" (Australia) has no reference term corresponding to the term "TOWNHALL-STREET," the path containing "MELBOURNE" (Australia) may be deleted. The interactive speech recognition system 102 be memory efficient because only reference terms of a respective category may be stored in memory. The interactive speech recognition system 102 may identify one or more terms in the speech phrase, which may correspond to a respective category of importance.

The physical location of the interactive speech recognition system 102 may affect operation of the system. For example, if the system 102 is located in Europe, the interactive speech recognition system 102 may process a spoken phrase, such as a driving destination, according to the following order of the categories in the database: 1) country, 2) city, 3) street name. If the interactive speech recognition system 102 is located in the US, for example, the categories may be processed according to the following order: 1) city, 2) street name.

If the user-controlled system is a vehicle navigation system 110, points of interest may be fully defined by two categories, such as "CITY HALL IN NEW YORK." The user may utter the key word "POINT OF INTEREST" in the spoken phrase. The interactive speech recognition system 102 may load or populate the list memory 226 with reference terms corresponding to the category "Points of Interest" of "NEW YORK." The reference terms may be associated with a unique address in the database 210.

Due to phonetic similarities, there may be situations where two or more reference terms may match a single term of the speech phrase, such as when the matched reference terms have different orthography but have the same pronunciation. For example, the reference terms "HARBOR STREET" and "HARBERSTREET" may both be matched to the term "HARBOR STREET" of a speech phrase.

The list of reference terms of the highest category may be stored in the list memory 226. For example, the name of the artist may correspond to the highest category, or category 1. The recognition circuit 220 may compare each reference term to each term of the speech phrase. When all of the reference terms have been compared to the terms of the speech phrase, and one or more reference terms have been matched to a term of the speech phrase, the search and matching process may be complete for the specified category. Each matched reference term may be added to a corresponding path. This process may be iteratively repeated. The next lower category may correspond to the title of the song, which may correspond to category 2. The matched reference term for category 2 corresponding to the song title may be concatenated with the matched reference terms of the previous category, thus extending the "path."

To minimize storage requirements for the list memory 226, paths may be deleted if no matching reference term is found in a particular category. Thus, loading the lists of reference terms according to the respective category may minimize memory requirements. For example, the list of artists may be loaded and compared to the terms of the speech phrase. If the artist name, such as "MADONNA," matches a term of the speech phrase, the list of all artists may be removed from memory or "unloaded," and the list memory 226 may be populated with the available song titles for "MADONNA." This may be more memory-efficient than simultaneously maintaining lists for all artists and all titles.

The interactive speech recognition system 102 may minimize user interaction by uniquely identifying the user command or request contained in the speech phrase. For example, a speech phrase may be as follows:

"I WANT TO LISTEN TO THE SONG FEVER FROM MADONNA."

In some systems, recognition processing for the entire speech phrase may be inefficient because it may be difficult to identify a reference term for the phrase "I WANT TO LISTEN TO." To minimize requests to the user for clarification, the interactive speech recognition system 102 may process only the terms "MADONNA" and "FEVER" of the speech phrase. Because the order of input terms may be arbitrary, requests for supplementary user input may be reduced. If supplementary user input is necessary, the interactive speech recognition system 102 may only require correction of certain individual terms, and may not require repetition of the entire speech phrase. This may enhance traffic safety in a vehicular environment by minimizing user distractions. Supplemental user input may be reduced by populating the list memory 226 with appropriate reference terms. Operating the list memory 226 at full capacity and processing all available paths may minimize requests for supplemental user input.

Figure 5:
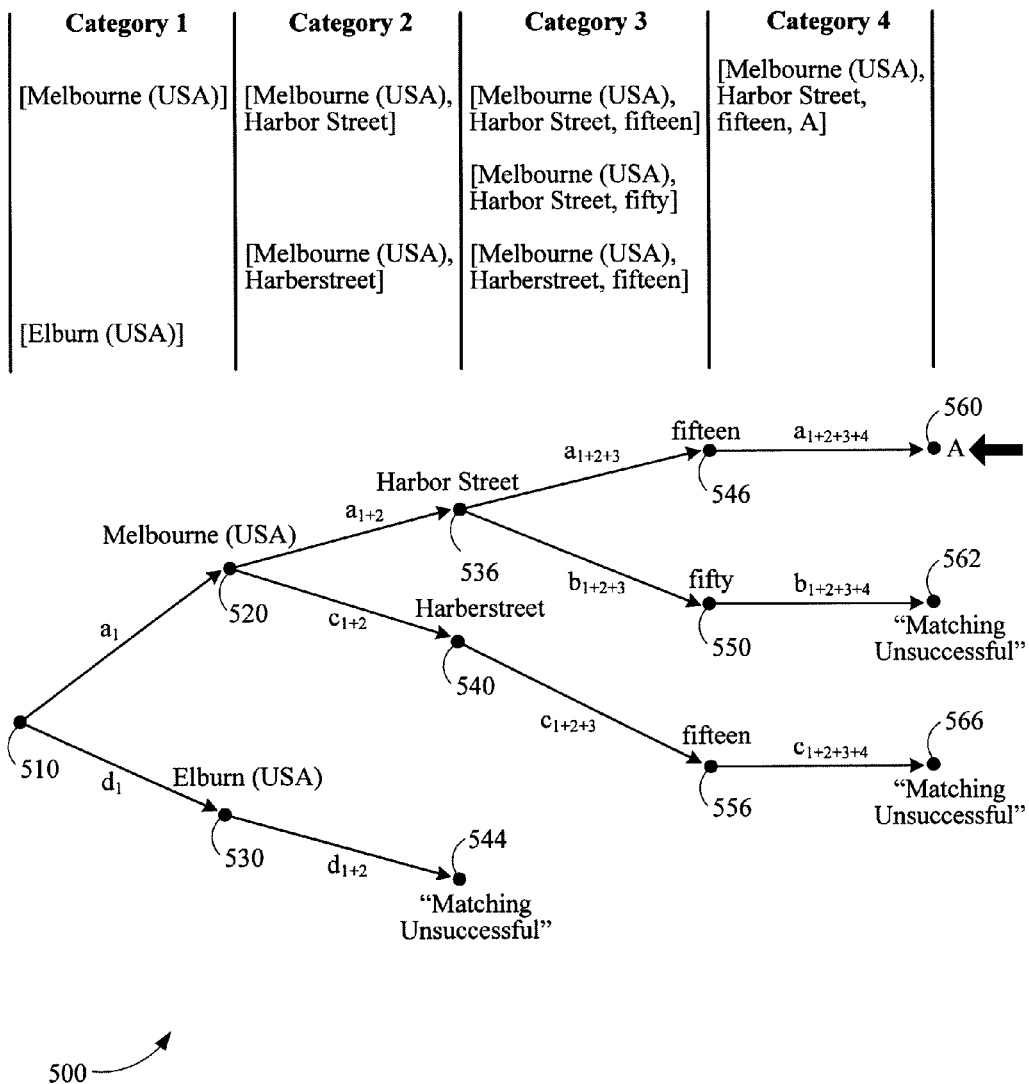
FIG. 5 is a phrase recognition process for a navigation system.

FIG. 5 is a recognition process 500 that may control a user-controlled system, such as a vehicle navigation system 110. The recognition process may recognize a spoken phrase that may uniquely identify a single entry in the database 210. For purposes of illustration, the speech phrase may be as follows:

"PLEASE DRIVE ME TO HARBOR STREET FIFTEEN A IN MELBOURNE."

The interactive speech recognition system 102 may determine a destination country. The interactive speech recognition system 102 may determine that the destination is located in the country in which the navigation system 110 and/or user are physically located. For example, in some systems, the navigation system 110 may include the GPS (global positioning system) receiver 144, which may inform the navigation system 110 of the current position or country location. In other systems, the user may select or input the destination country explicitly.

Node 502 may represent identification of the destination country, which may be the United States. The interactive speech recognition system 102 may begin processing the highest category (category 1), and may populate the list memory 226 with the cities of the respective country destination. MELBOURNE (node 520) and ELBURN (node 530) may represent the cities that may be loaded. The recognition circuit 220 may compare each reference term (each city) of the list memory 226 with each term of the speech phrase. After processing the highest category, two reference terms may be identified by considering orthographic and/or phonetic similarity of the matched reference terms. In this example, the US cities of "MELBOURNE" and "ELBURN" may be matched to one term of the spoken phrase. Processing the category 1 term may result in the following path allocation:

[Melbourne (USA)] Path "$a_1$"
[Elbum (USA)] Path "$d_1$"

If a destination country had been neither pre-selected nor identified by the GPS receiver 144 or other device, category 1 processing may have identified more than two cities. For example, matched cities may include "MELBOURNE" (Australia), "MELBOURNE" (USA), "ELBURN" (USA) and "MALBORN" (Germany).

The paths labeled as "$a_1$" and "$d_1$" may represent the matched US cities. Both paths ("$a_1$" and "$d_1$") may be maintained because either path may be a valid path, depending upon subsequent processing to identify street names. In some systems, after each search for a particular category has been completed, the recognition circuit 220 may determine if one path uniquely identifies a database entry. If so, route calculation processing may be initiated.

The processing circuit 204 may determine whether there is sufficient storage capacity for loading a list of street names for each of the two matched US cities in the current category. The interactive speech recognition system 102 may request supplemental user input to uniquely identify the target city if loading the street names for both matched cities would exceed memory capacity. If sufficient memory is available, both paths and the corresponding list of cities may remain resident in the list memory 226.

The recognition circuit 220 may query the database 210 for all street names for the US cities of "MELBOURNE" and "ELBURN." The database 210 may return two lists of reference terms according to the next category (category 2). The reference terms corresponding to the street names may be loaded into the list memory 226.

The interactive speech recognition system 102 may process node 520, which may represent the end of path "$a_1$." The recognition circuit 220 may search the respective terms in the list memory 226 corresponding to the US city of "MELBOURNE" for a matching term in the spoken phrase contained in the input memory 230. Two street names may match the term "HARBOR STREET" of the spoken phrase, namely, "HARBOR STREET" (path $a_{1+2}$) and "HARBERSTREET" (path $c_{1+2}$). Because two street names may be matched, the path may be "split" and extended to node 536 and node 540.

The above process may be applied to the US city of "ELBURN." In this case, there may be no match, whether orthographic or phonetic, between the street name of the spoken phrase and the reference terms obtained from the database 210 corresponding to the city of ELBURN. This may be shown at node 544 (path $d_{1+2}$).

Separate processing of the list memory 226 and the input memory 230 may permit efficient matching of the reference terms, such as street names and city names. If all of the street names of the matched cities were loaded into a single list of reference terms, allocation of paths with matching cities may exceed memory capacity.

With respect to the paths of FIG. 5, the path $a_{1+2}$ may identify the path from node 510 to nodes 520 and 536, while the path "$c_{1+2}$" may identify the path from node 510 to nodes 520 and 540. Processing the category 2 term may result in the following path allocation:

[Melbourne (USA), Harbor Street] Path "$a_{1+2}$"
[Melbourne (USA), Harberstreet] Path "$c_{1+2}$"

Because no reference term may be matched to a term of the spoken phrase for the city of "ELBURN (USA)" indicated at node 544, the path identified as "$d_{1+2}$" may be deleted. The deleted path may include nodes 510 to 530 and nodes 530 to 544. The deleted paths may be excluded from subsequent processing. If a path uniquely identifies a destination, the processing circuit 204 may request a route calculation. This may occur at the end of processing for each of the category levels.

If sufficient memory is available, both paths, "$a_{1+2}$" and "$c_{1+2}$," may be resident in memory, and the lists of street names may be deleted or unloaded from memory. The recognition circuit 220 may query the database 210 for all house numbers of the streets "HARBOR STREET" in "MELBOURNE" (USA) and "HARBERSTREET" in "MELBOURNE" (USA). The database 210 may return lists of reference terms according to the next category, or category 3. The list memory 226 may be populated with the house numbers of the corresponding streets.

The recognition circuit 220 may process node 536, which may represent the end of path "$a_{1+2}$," and may search the list memory 226 corresponding to "HARBOR STREET" (MELBOURNE, USA) for a term representing house numbers that may appear in the input memory 230 corresponding to the spoken phrase. For example, two house numbers may match the term "Fifteen" of the spoken phrase, namely, "Fifteen" (path "$a_{1+2+3}$") and "Fifty" (path "$b_{1+2+3}$"). Based on the matched terms, the path may be "split" again and extended to nodes 546 and 550.

The recognition circuit 220 may process the street "HARBERSTREET" (Melbourne, USA) at node 540, where a single reference term for the number "Fifteen" (path "$a_{1+2+3}$", node 556) may match a term of the spoken phrase. No further valid house number for this street may provide an orthographic or phonetic match to the term "Fifteen" of the spoken phrase.

Processing the category 3 term may result in the following path allocation:

[Melbourne (USA), Harbor Street, fifteen] Path "$a_{1+2+3}$"
[Melbourne (USA), Harbor Street, fifty] Path "$b_{1+2+3}$"
[Melbourne (USA), Harberstreet, fifteen] Path "$c_{1+2+3}$"

If sufficient memory is available, the three identified paths, "$a_{1+2+3}$," "$b_{1+2+3}$," and "$c_{1+2+3}$" may be resident in memory, and the lists of house numbers may be unloaded or deleted from memory. The recognition circuit 220 may query the database 210 for suffixes corresponding to the matched house numbers of "FIFTEEN" and "FIFTY" for the respective matched street names and matched city of each path. The database 210 may return a list of reference terms according to the next category (category 4). The suffixes of the house numbers may be loaded into the list memory 226.

In this example, only suffix "A" may be available for house number "FIFTEEN" or "FIFTY," and may correspond to house number "FIFTEEN" in "HARBOR STREET" in "MELBOURNE, USA". This may be shown as path "$a_{1+2+3+4}$" and may include the paths from nodes 510 through 560. This resultant path (path "$a_{1+2+3+4}$") may be the only remaining path after non-matched paths have been deleted. For example, path "$b_{1+2+3+4}$" (nodes 510 through 562) and path "$c_{1+2+3+4}$" (notes 510 through 566) may be deleted.

Processing the category 4 term may result in the following path allocation:

[Melbourne (USA), Harbor Street, fifteen, A] Path "$a_{1+2+3+4}$"

The processing circuit 204 may determine that the remaining path "$a_{1+2+3+4}$" uniquely identifies an entry of the database 210. In response, the processing circuit 204 may launch a navigation application or control the navigation system 110 to calculate the route corresponding to the identified address.

Although the interactive speech recognition system 102 may not receive the exact or unique identification of each word in the spoken phrase, the recognition circuit 220 may determine and match the correct entry of the database 210 by considering phonetic similarity of the terms of the spoken phrase. This may avoid requests for supplemental user input.

Figure 6:
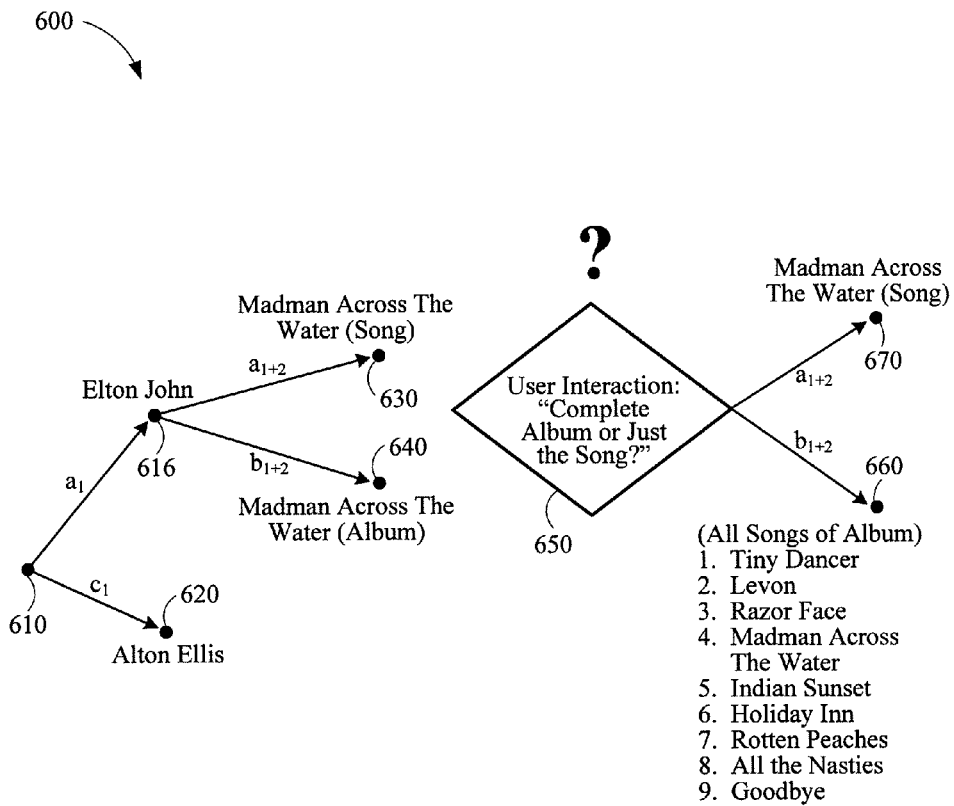
FIG. 6 is a phrase recognition process for a media system.

FIG. 6 is a recognition process 600 that may be used when the user-controlled system is an audio/video entertainment system or other media system 114. The recognition process may recognize a spoken phrase that may uniquely identify a plurality of entries in the database 210. The speech phrase may be as follows:

"I WANT TO LISTEN TO MADMAN ACROSS THE WATER FROM ELTON JOHN."

The categories of the database 210 may not have a hierarchical order. In response to a query for the highest category term, the database 210 may return a list of reference terms that may correspond to the category "title" or to the category "album" of a digital music file. The order of the categories loaded into the list memory 226 may be defined by the order of the input terms of the spoken phrase.

The recognition circuit 220 may first populate the list memory 226 with the reference terms of the category "artist." However, the reference terms may be loaded into memory according to the highest or first category "artist," the second category "album," or the third category "title."

The interactive speech recognition system 102 may process the spoken phrase and identify a plurality of possible paths, such as paths "$a_1$" and "$b_1$," which may begin at a node 610. Path "$a_1$" may terminate at node 616, and path "$b_1$" may terminate at node 620. The matched reference terms for the category "artist" may be "ELTON JOHN" and "ALTON ELLIS." The recognition circuit 220 may determine that for the reference term "ALTON ELLIS," there may be no artist in the database 210 that matches the album or song "MADMAN ACROSS THE WATER." Because there may be no match, the path "$b_1$" may be deleted, which may be shown terminated at node 620.

The recognition circuit 220 may match the reference term "ELTON JOHN" in the list memory 226 to a term of the spoken phrase in the input memory 230, shown at nodes 630 (path $a_{1+2}$) and 640 (path $b_{1+2}$), respectively. The recognition circuit 220 may then match the reference term "MADMAN ACROSS THE WATER." The reference term "MADMAN ACROSS THE WATER" may be both an album having a plurality of corresponding titles and a single song title. Because the term may not be uniquely identified, the recognition circuit 220 may request supplemental user input, shown at node 650.

The user may clarify which path was intended. For example, the user may select the album "MADMAN ACROSS THE WATER" by issuing a verbal command or term, such as "ALBUM." Because the user may provide supplemental input, the song titles corresponding to the album "MADMAN ACROSS THE WATER" may uniquely match the reference terms, indicated at node 660 (path $a_{1+2}$). The processing circuit 204 may launch a media playback application and/or control the media system 114 to playback of the matched reference terms, namely, the songs of the album.

At node 650, the user may select the song "MADMAN ACROSS THE WATER" by issuing a verbal command or term, such as "SONG, rather than "Album." The processing circuit 204 may then launch a media playback application and/or control the hardware device for playback of the matched reference terms, namely, the song entitled "MADMAN ACROSS THE WATER," shown at node 670.

In some systems, the recognition circuit 220 may first populate a list of reference terms for each category depending on the capacity of the list memory 226. For example, the reference terms of the categories "Album" and "TITLE" may be loaded first if loading the list of reference terms of the category "ARTIST" would exceed the capacity of the list memory 226. Once the list memory 226 is loaded, the recognition circuit 220 may match one or more reference terms to one or more terms of the spoken phrase. For example, the matched reference terms may be "MADMAN ACROSS THE WATER" (song) and "MADMAN ACROSS THE WATER" (album).

The matched reference terms may be stored, and the list memory 226 may be unloaded if certain categories could not be loaded due to insufficient memory capacity. The list of reference terms of the remaining categories may then be loaded, which may correspond to the reference terms of the category "ARTIST." After the recognition circuit 220 has matched the reference terms, the concatenation of terms may identify a database entry. Using a structured query language (SQL), a database request may have the following format:

SELECT*FROM database WHERE ((song='Madman across the water') OR (album='Madman across the water')) AND ((artist='Elton John') OR (artist='Alton Ellis')).

The above SQL request may identify an entry of a digital music file in the database 210. The logical "AND" operator may combine the categories of "ALBUM" and "TITLE," which may direct the database 210 to identify the song "MADMAN ACROSS THE WATER" corresponding to the album "MADMAN ACROSS THE WATER" from the artist "ELTON JOHN." The logical "OR" operator may cause the database 210 to identify the song "MADMAN ACROSS THE WATER" and the album "MADMAN ACROSS THE WATER," along with the album's corresponding songs. The matched reference terms of the same category may be combined using the logical "OR" operator, or the matched reference terms of different categories may be combined using the logical "OR" operator.

Figure 7:
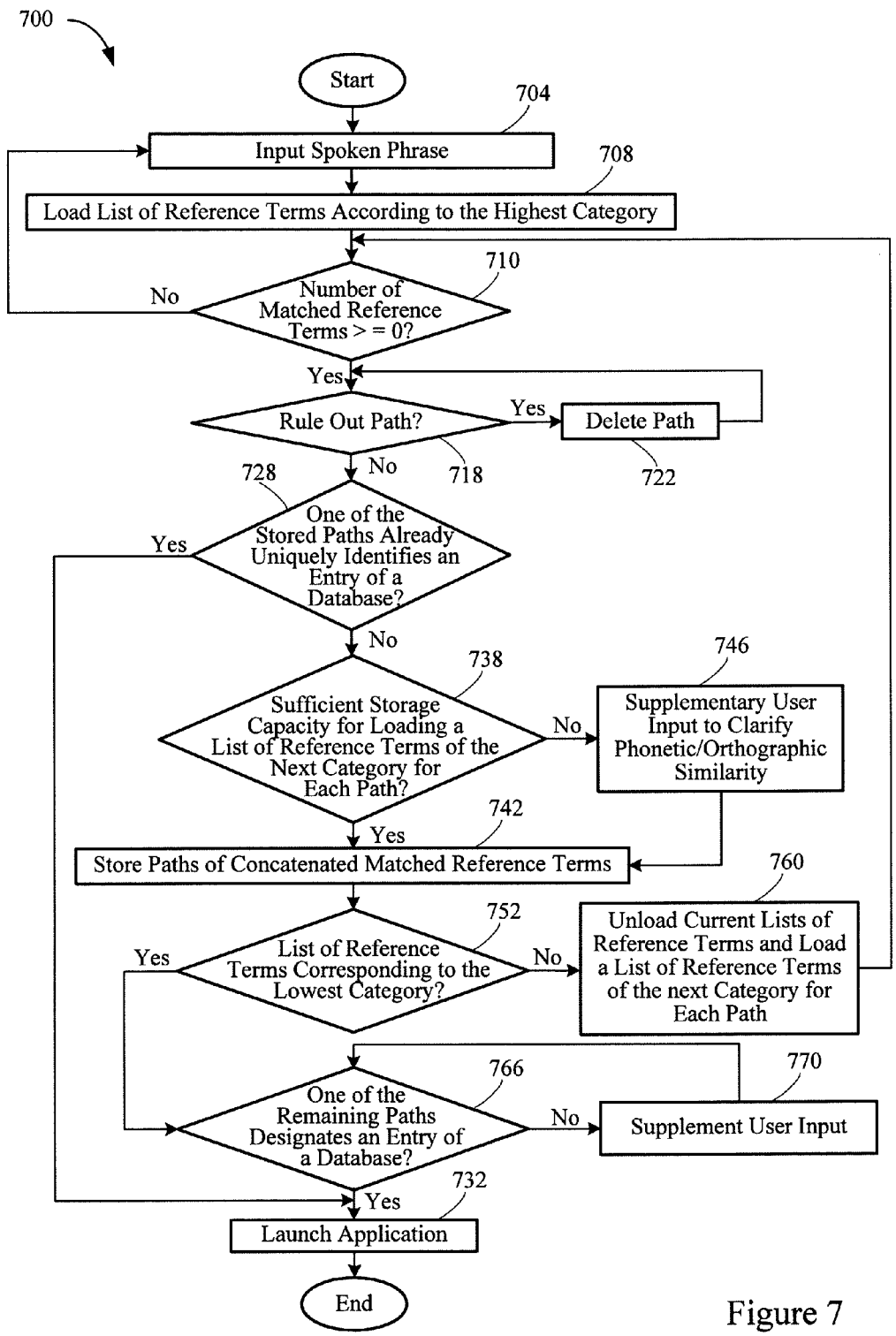
FIG. 7 is a speech recognition process for a user-controlled system.

FIG. 7 is a recognition process 700. A user may input a spoken phrase (Act 704). The recognition circuit 220 may load the list memory 226 with the reference terms corresponding to the highest category (Act 708). The database 210 may contain reference terms for the respective application, such as titles, albums, and artists for a media library; destinations and addresses of a navigation route guidance system; commands for operating a computer (or vehicle computer); commands for controlling a vehicle-based device; or commands for querying an external online database.

Each reference term of the list memory 226 may be compared to each term of input memory 230 corresponding to the spoken phrase (Act 710). If no reference term of the list memory 226 matches a term of the input memory 230, the user may be requested to repeat the spoken phrase (Act 704). If one or more reference terms in the list memory 226 matches one or more terms in the input memory 230, the recognition circuit 220 may determine if a path can be deleted due to lack of a reference term for the current category (Act 718). A path may be defined as the concatenation of matched reference terms of the various categories. The recognition circuit 220 may delete the path if a reference term for the current category cannot be identified (Act 722).

The recognition circuit 220 may determine if one of the identified paths uniquely identifies a database entry (Act 728). If so, the recognition circuit 220 may launch the appropriate application or may control a corresponding physical device (Act 732). If no entry of the database 210 can be uniquely identified by the identified paths, the processing circuit 204 may determine if sufficient memory storage is available for loading the reference terms of the next category "n+1" for each path of category "n" (Act 738).

If sufficient memory is available, the recognition circuit 220 may store the paths corresponding to the concatenated matched reference terms (Act 742). If sufficient memory is not available, the recognition circuit 220 may request supplemental input from the user to clarify the matched reference terms in view of phonetic and/or orthographic relationship (Act 746). This may decrease the number of stored paths and may reduce memory storage requirements.

The recognition circuit 220 may determine if the lists of reference terms correspond to the lowest category (Act 752). If the lists of reference terms do not correspond to the lowest category, the current lists of reference terms may be unloaded or deleted, and the lists of reference terms for the next category may be populated (Act 760). The lists of reference terms to be populated may correspond to the matched reference terms of the paths at category "n."

If the lists of reference terms correspond to the lowest category, the recognition circuit 220 may determine if one of the remaining paths uniquely identifies a database entry (Act 766). If a database entry is not uniquely identified, the recognition circuit 220 may request supplemental user input (Act 770) to identify the correct path from among the remaining paths. Supplemental user input may provide one matched reference term of the previous category or categories. If a database entry is uniquely identified, the recognition circuit 220 may launch the appropriate application or may control a corresponding physical device (Act 732).

In some systems, the interactive speech recognition system 102 may recognize keywords. Before the user inputs a spoken phrase (Act 704), the interactive speech recognition system 102 may load a hierarchical structure corresponding to the various categories based on keywords.

The interactive speech recognition system 102 may minimize the number of requests for supplemental user input. If a supplemental user request is needed, the interactive speech recognition system 102 may request clarification of a specific term of the spoken phrase. To summarize the process of FIG. 7, the interactive speech recognition system 102 may maintain one or more paths in memory, and may determine if for each matched reference term of a current category "n," a corresponding list of reference terms for a next category "n+1" can be loaded into the list memory 226. If the memory capacity of the list memory 226 may be exceeded, the recognition circuit 220 may request the user to identify a path of a matched reference term of a previous category so as to reduce the number of paths.

Figure 8:
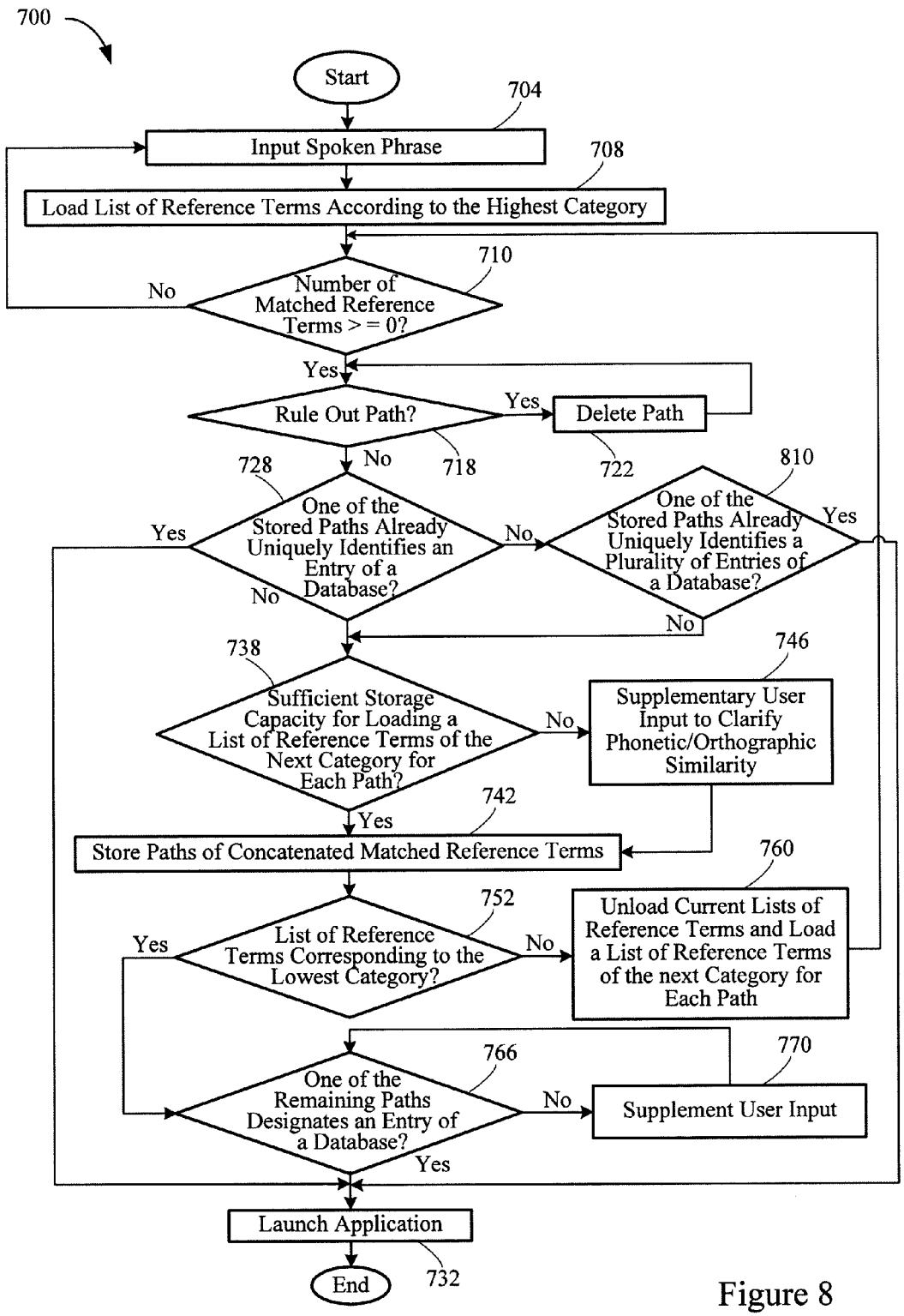
FIG. 8 is a speech recognition process for a user-controlled system.

FIG. 8 is a recognition process 800 that may be used in some systems. If the recognition circuit 220 determines that one of the identified paths may uniquely identify a database entry (Act 728), the recognition circuit 220 may determine if one of the stored paths uniquely identifies a plurality of database entries (Act 810), rather than a single database entry. If a plurality of database entries are identified, the recognition circuit 220 may launch the appropriate applications or may control the corresponding physical devices (Act 732).

In some systems, the interactive speech recognition system 102 may not match a reference term with the highest category. Rather than requesting supplemental user input or requesting the user to repeat the speech phrase (Act 704), the processing circuit 204 may populate the list memory 226 with reference terms of the next category depending upon available memory capacity. The recognition circuit 220 may match one or more reference terms to a term of the spoken phrase. When processing the "next" category, the recognition circuit 220 may identify paths that may be deleted.

For a given category, the reference term of the highest category may be obtained based on the matched reference terms of the category other than the first category. For example, if a city name cannot be matched to a term of the spoken phrase, the processing circuit 204 may populate the list memory 226 with the street names of all cities if sufficient memory is available. In this way, processing may proceed until paths are determined to be invalid. Based on the elimination of certain paths, the previously unrecognizable term corresponding to a category (e.g. city) may be identified, which may minimize requests for supplemental user input.

The terms of the spoken phrase may be input by the user in an arbitrary order. That is, the user need not necessarily speak a proper or grammatically correct sentence. The interactive speech recognition system 102 may provide the user with a visual output showing the reference terms or paths that may require clarification. The order of the terms displayed may be based on the likelihood that the terms may match a term of the spoken phrase.

If the processing circuit 204 determines that there is insufficient memory available to fully populate the list memory 226 with reference terms of category "n+1" for each path of category "n," the recognition circuit 220 may process the matched reference term of the path of category "n" having the highest likelihood of matching a path uniquely identifying a database entry. This may minimize requests for supplemental user input. A list of reference terms may be loaded according to the matched reference term of a particular path. After the matching within the same category, the next path may be selected having the next lower likelihood of uniquely identifying a database entry. The list of reference terms according to the currently selected path may be loaded, and matching may be iteratively repeatedly until all paths have been processed.

For example, a spoken phrase may be as follows:
"DRIVE ME TO ELIZABETH STREET BERKELEY" where "ELIZABETH" may be the city in New Jersey, or "BERKELEY" may be the city in California.

The interactive speech recognition system 102 may initially match the reference term "BERKELEY" (a city) to a term of the spoken phrase, and may associate this matched reference term with a path having the highest likelihood of uniquely identifying a database entry. The second matched reference term of this highest category may be the city "ELIZABETH" of New Jersey. If the list memory 226 does not have sufficient memory to contain all street names of both matched cities, the recognition circuit 220 may first select the reference term "BERKELEY" based on the highest likelihood, and may populate the list memory 226 with all of the street names in "BERKELEY." If there is no reference term in the list memory 226 that matches the term "ELIZABETH STREET" of the spoken phrase, the list of street names corresponding to the matched reference term (city) "BERKELEY" may be deleted or unloaded from the list memory 226, and the path may be eliminated.

The recognition circuit 220 may then populate the list memory 226 with the list of street names corresponding to the city "ELIZABETH." The reference term "BERKELEY STREET" may be matched to a term of the spoken phrase. If a match is found, a path may be established having the matched reference terms for "ELIZABETH" and "BERKELEY STREET." This may designate the path having the highest likelihood of uniquely identifying a database entry. For each subsequent category, the paths may be ordered based on their likelihood of uniquely identifying a database entry.

In some systems, operating parameters may be used to recognize a spoken phrase. In systems that may include a navigation system 110 for example, such operating parameters may include a current location of the interactive speech recognition system 102 or vehicle. The global positioning system receiver 144 may provide such location information. Use of the operating parameters may minimize requests for supplemental user input because the operating parameter provided by the global positioning system receiver 144 may match one of the potential city names in the spoken phrase. This may permit the user to input the street name and house number only, rather than articulating a complete address.

For systems that may include a media or entertainment system, such operating parameters may include identification of a media file of a media library currently being played or which may have been selected from a play list. In some systems, an operating parameter may be used to determine the path most likely to uniquely identify a database entry. In other systems, an operating parameter may be used to identify a reference term of a higher category than may have been identified in the spoken phrase.

In other systems, an operating parameter may be used to initially determine a reference term that may be needed to correctly recognize one or more terms in an input spoken phrase. For example, a user located in New York (city) may input only a street name and a house number. The interactive speech recognition system 102 may determine that the spoken phrase does not represent a complete destination address, and may initially determine the highest category corresponding to the spoken phrase. The interactive speech recognition system 102 may resolve the city name as New York by using the operating parameter provided by the global positioning system. The city name may be used as the reference term of the next higher category. The interactive speech recognition system 102 may match reference terms to the spoken phrase that corresponds to the operating parameter "NEW YORK." The processing circuit 204 may populate the list memory 226 with a list of reference terms of category "n" (street name) that may substitute for the terms of category "n+1" ("New York").

The logic, circuitry, and processing described above may be encoded in a computer-readable medium such as a CDROM, disk, flash memory, RAM or ROM, an electromagnetic signal, or other machine-readable medium as instructions for execution by a processor. Alternatively or additionally, the logic may be implemented as analog or digital logic using hardware, such as one or more integrated circuits (including amplifiers, adders, delays, and filters), or one or more processors executing amplification, adding, delaying, and filtering instructions; or in software in an application programming interface (API) or in a Dynamic Link Library (DLL), functions available in a shared memory or defined as local or remote procedure calls; or as a combination of hardware and software.

The logic may be represented in (e.g., stored on or in) a computer-readable medium, machine-readable medium, propagated-signal medium, and/or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory "RAM," a Read-Only Memory "ROM," an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan), then compiled, and/or interpreted or otherwise processed. The processed medium may then be stored in a computer and/or machine memory.

The systems may include additional or different logic and may be implemented in many different ways. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors. The systems may be included in a wide variety of electronic devices, including a cellular phone, a headset, a hands-free set, a speakerphone, communication interface, or an infotainment system.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method of interactively recognizing a spoken phrase using a database in which is stored reference terms, the reference terms being organized into categories, the method comprising:
   (a) forming, by an interactive speech recognition system, an initially empty path in an output memory of the interactive speech recognition system, receiving terms identified in the spoken phrase into an input memory of the interactive speech recognition system, and loading one or more reference terms of a first category from the database into a list memory of the interactive speech recognition system;
(b) determining by the interactive speech recognition system when one or more of the reference terms in the list memory matches one or more terms of the spoken phrase in the input memory, and continuing with process (a) when there is no match;
(c) determining by the interactive speech recognition system, that the spoken phrase has been recognized when one or more paths in the output memory uniquely identify a database entry;
(d) determining by the interactive speech recognition system when the list memory has sufficient capacity to load the reference terms of a set of subsequent categories, each category in the set being determined by a respective path stored in the output memory, and when the list memory has insufficient capacity, eliminating by the interactive speech recognition system one or more paths from the output memory based on supplemental user input;
(e) replacing, by the interactive speech recognition system in the output memory, each given path with a set of extended paths for disambiguating the spoken phrase, each path in the set of extended paths being formed by the interactive speech recognition system by concatenating to the given path a different reference term in the list memory that matches the given path, wherein when the given path matches no such reference terms, the set includes no extended paths and the given path is deleted from the output memory by the interactive speech recognition system;
(f) loading the list memory by the interactive speech recognition system with the reference terms of the set of categories, and continuing with process (b); and
(g) controlling, by the interactive speech recognition system after determining that the spoken phrase has been recognized, a system in communication with the interactive speech recognition system.

2. The method of claim 1, where eliminating one or more paths based on supplemental user input further comprises:
identifying a reference term based on the supplemental user input; and
eliminating all paths in the output memory containing the identified reference term.

3. The method of claim 1, further comprising:
selecting a path in the output memory having a highest likelihood of uniquely identifying an entry in the database; and
loading the list memory with reference terms for the selected path, when the list memory has insufficient capacity to load the reference terms of the set of categories.

4. The method of claim 3, where a path in the output memory is determined to have the highest likelihood of uniquely identifying an entry in the database based on a parameter obtained from a user-controlled system.

5. The method of claim 3, further comprising:
eliminating a path in the output memory when no match is found between reference terms in the list memory and a term in the spoken phrase.

6. The method of claim 1, further comprising, when a path uniquely identifies a database entry, launching an application using the uniquely identified database entry.

7. The method of claim 6, wherein the database includes a predetermined maximum number of different categories for each path, further comprising:

requesting supplemental user input when more than one path remains in the output memory after matching the predetermined maximum number of different categories.

8. The method of claim 6, where the uniquely identified database entry corresponds to a user-controlled system.

9. The method of claim 8, where the user-controlled system is a media system, a navigation system, or a computer system.

10. The method of claim 1, wherein an order in which reference terms are concatenated to a path in the output memory is different than an order in which the reference terms appear in the spoken phrase.

11. The method of claim 1, wherein an order in which reference terms are concatenated to a path in the output memory is the same as an order in which the reference terms appear in the spoken phrase.

12. The method of claim 1, where a reference term in the list memory matches a term of the spoken phrase when the reference term has a phonetic similarity greater than a predetermined threshold relative to a reference term in the input memory.

13. The method of claim 1, where obtaining supplemental input further comprises visually or acoustically outputting a list of reference terms that potentially match a term of the spoken phrase.

14. The method of claim 13, where an output order of the reference terms is based on a likelihood that the reference terms match respective terms of the spoken phrase.

15. A non-transitory computer-readable storage medium having processor executable instructions to interactively recognize a spoken phrase using a database in which is stored reference terms, the reference terms being organized into categories, by performing the acts of
(a) forming, by an interactive speech recognition system, an initially empty path in an output memory of the interactive speech recognition system, receiving terms identified in the spoken phrase into an input memory of the interactive speech recognition system, and loading one or more reference terms of a first category from the database into a list memory of the interactive speech recognition system
(b) determining by the interactive speech recognition system when one or more of the reference terms in the list memory matches one or more terms of the spoken phrase in the input memory, and continuing with process (a) when there is no match;
(c) determining by the interactive speech recognition system that the spoken phrase has been recognized when one or more paths in the output memory uniquely identify a database entry, thereby indicating that the spoken phrase has been recognized;
(d) determining by the interactive speech recognition system when the list memory has sufficient capacity to load the reference terms of a set of subsequent categories, each category in the set being determined by a respective path stored in the output memory, and when the list memory has insufficient capacity, eliminating, by the interactive speech recognition system, one or more paths from the output memory based on supplemental user input;
(e) replacing by the interactive speech recognition system in the output memory, each given path with a set of extended paths for disambiguating the spoken phrase, each path in the set of extended paths being formed by the interactive speech recognition system by concatenating to the given path a different reference term in the list memory that matches the given path, wherein when the given path matches no such reference terms, the set includes no extended paths and the given path is deleted from the output memory by the interactive speech recognition system;

(f) loading the list memory by the interactive speech recognition system with the reference terms of the set of categories, and continuing with process (b); and (g) controlling, by the interactive speech recognition system after determining that the spoken phrase has been recognized, a system in communication with the interactive speech recognition system.

16. The computer-readable storage medium of claim 15, further comprising processor executable instructions to cause a processor to perform the acts of:

identifying a reference term based on the supplemental user input; and eliminating all paths in the output memory containing the identified reference term.

17. An interactive speech recognition system for interactively recognizing a spoken phrase, the system comprising:

a database containing a plurality of reference terms, the reference terms being organized into categories;

an input memory configured to store terms identified in a spoken phrase;

an output memory configured to store a plurality of paths, wherein a path is a concatenation of matched reference terms of different categories;

a list memory configured to store reference terms of a set of categories;

a processing circuit configured to populate the list memory with the reference terms of the set of categories;

a recognition circuit configured to determine when a reference term in the list memory matches one or more terms of the spoken phrase in the input memory;

the recognition circuit or the processing circuit further including:

means for determining that the spoken phrase has been recognized when one or more paths in the output memory uniquely identify a database entry;

means for determining when the list memory has sufficient capacity to load the reference terms of a set of subsequent categories, each category in the set being determined by a respective path stored in the output memory;

means for eliminating one or more paths from the output memory based on supplemental user input when the list memory has insufficient capacity;

means for replacing, in the output memory, each given path with a set of extended paths for disambiguating the spoken phrase, each path in the set of extended paths being formed by concatenating to the given path a different reference term in the list memory that matches the given path, wherein when the given path matches no such reference terms, the set includes no extended paths and the given path is deleted from the output memory; and means for loading the list memory with the reference terms of the set of categories.

18. The speech recognition system of claim 17, where the recognition circuit or the processing circuit selects a path in the output memory having a highest likelihood of uniquely identifying an entry in the database, and loads the list memory with reference terms for the selected path, when the list memory has insufficient capacity to load the reference terms of the set of categories.

* * * * *